United States Patent Office 3,660,397
Patented May 2, 1972

3,660,397
IMIDAZO[4,5-b]PYRAZINES
James H. Jones, Blue Bell, and Edward J. Cragoe, Jr., Lansdale, Pa., assignors to Merck & Co., Inc., Rahway, N.J.
No Drawing. Filed Apr. 17, 1970, Ser. No. 29,674
Int. Cl. C07d 51/76
U.S. Cl. 260—250 R                                20 Claims

ABSTRACT OF THE DISCLOSURE

Imidazo[4,5-b]pyrazines bearing a hydrogen or hydrocarbyl substituent in the two position are prepared by cyclization of a 2-amino-3-acylamino pyrazine.

This invention relates to imidazo[4,5-b]pyrazines and particularly to 5-amino(or substituted amino)-6-halo(or lower alkyl)imidazo[4,5-b]pyrazines and to processes for their preparation.

The novel compounds of this invention can be represented by the following structural formula:

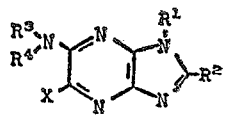

wherein $R^1$ represents
  (a) hydrogen,
  (b) $C_{3-5}$-lower alkenyl, or
  (c) $C_{1-6}$-lower alkyl, ether unsubstituted or substituted with
    (i) $C_{1-3}$-lower alkoxy, or
    (ii) di($C_{1-3}$-lower alkyl)amino;
$R^2$ represents
  (a) hydrogen,
  (b) phenyl, either unsubstituted or substituted with
    (i) $C_{1-3}$-lower alkyl,
    (ii) halo, such as chloro or fluoro,
    (iii) $C_{1-3}$-lower alkoxy,
  (c) $C_{1-6}$-lower alkyl, either unsubstituted or substituted with
    (i) trifluoromethyl,
    (ii) $C_{1-3}$-lower alkoxy,
    (iii) phenoxy,
    (iv) phenyl, either unsubstituted or substituted with
      (1) $C_{1-3}$-lower alkyl,
      (2) $C_{1-3}$-lower alkoxy,
      (3) halo, such as chloro or fluoro,
$R^3$ represents
  (a) hydrogen,
  (b) $C_{3-5}$-lower alkenyl,
  (b) $C_{3-7}$-lower cycloalkyl,
  (d) $C_{1-6}$-lower alkyl either unsubstituted or substituted with
    (i) trifluoromethyl,
    (ii) pyridyl, (iii)

wherein $R^5$ and $R^6$ can be the same or different and each represents a $C_{1-6}$-lower alkyl and can be linked together directly to form a 5–7 membered heterocyclic ring with the nitrogen atom to which they are attached, or can be linked together through a hetero atom to form a morpholino or N-$C_{1-3}$-lower alkyl-piperazino ring;
$R^4$ represents
  (a) hydrogen, or
  (b) $C_{1-6}$-lower alkyl;
$R^3$ and $R^4$ when lower alkyl can be linked together directly to form a 5–7 membered saturated heterocycle with the nitrogen to which they are attached;
$R^3$ and $R^4$ when lower alkyl can be linked together through a hetero atom to form a morpholino or N-$C_{1-3}$-lower alkyl-piperazino ring with the nitrogen atom to which they are attached; and
X represents
  (a) $C_{1-3}$-lower alkyl, and
  (b) halo, such as chloro or bromo.

The substituted imidazo[4,5-b]pyrazines of this invention are orally active, relatively nontoxic antihypertensive agents. They can be administered in the form of pills, tablets, capsules, elixirs, injectable preparations, aerosol preparations and the like and can comprise one or more of the compounds of this invention as the only essential active ingredient of the pharmaceutical formulation, or, the novel compound(s) can be combined in pharmaceutical formulations with other therapeutic agents. The compounds of this invention are advantageously administered at a dosage range of from about 5 mg./day to about 750 mg./day or at a somewhat higher or lower dosage preferably in subdivided amounts on a 2 to 4 times a day regimen.

The novel products of this invention having Formula II are prepared by heating at from 50° C. to 150° C., a mixture of a 2-amino-3-acylamino compound of Formula I in an anhydrous solvent for about 15 minutes to about 2 hours, and concentrating the reaction mixture to dryness. The actual solvent employed is not critical, but the reaction is promoted by one that is miscible with water or otherwise favors removal of the elements of water from the starting material. Such a solvent is acetic acid and is the solvent of choice for purposes of this description. The process is represented by the following equation:

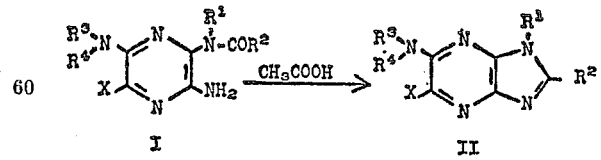

The starting materials and intermediates required for the preparation of the novel compounds of this invention are obtained by the following reaction sequences:

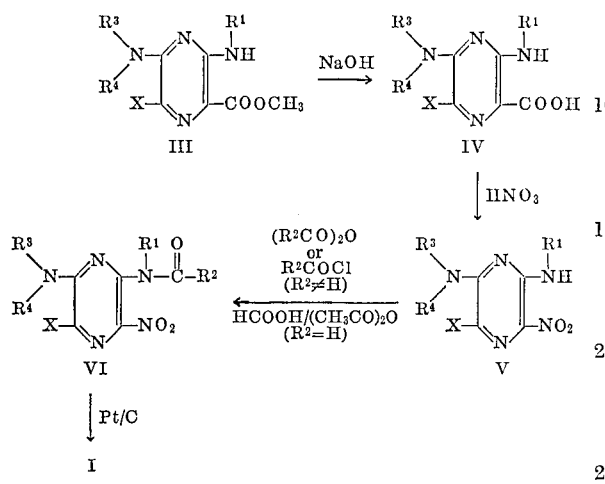

Many of the pyrazinoic acids, IV, are known and they are prepared from the corresponding esters, III, by standard saponification techniques.

The 2-nitro-3-amino compounds of Formula V are prepared by treatment of the pyrazionic acids, IV, with a nitrating mixture which results in concomitant decarboxylation and nitration at the 2-position. The procedure comprises adding slowly a 1:1 mixture (v./v.) of concentrated sulfuric acid and concentrated nitric acid to a stirred mixture of the pyrazinoic acid in concentrated sulfuric acid at a temperature of —5° to +20° C. After one to two hours of stirring without temperature control, the reaction mixture is quenched by pouring onto crushed ice and the precipitated product is isolated by filtration.

The 2-nitro-3-acylaminopyrazines depicted by Formula VI are prepared by acylation of the corresponding amino compound V with any recognized acylating agent, the common ones being the acyl halides and acid anhydrides. Generally the procedure comprises heating a solution of the amino compound in an excess of the acid anhydride or acid chloride at the boiling point or at about 100° C. for 1 to about 4 hours.

In the special case wherein $R^2$ of Formula VI is hydrogen, the acylating agent is a mixture of about 2 parts of formic acid and 5 parts acetic anhydride (v./v.), which provides in reality the mixed anhydride of formic and acetic acids as the acylating agent.

The nitro group of the compound of Formula VI is reduced to yield the corresponding 2-amino-3-acylamino compound of Formula I by catalytic reduction with a noble metal such as platinum, palladium or the like, preferably with platinm on a carbon carrier.

EXAMPLE 1

2-Benzyl-5-ethylamino-6-chloroimidazo-[4,5-b]pyrazine

Step A: Preparation of 3-amino-5-ethylamino-6-chloropyrazinoic acid.—A mixture of methyl 3-amino-5-ethylamino-6-chloropyrazine (20 g.) and 130 ml. of 5% sodium hydroxide solution is heated on the steam bath for one hour. The hot reaction mixture is filtered and treated with sufficient 5% hydrochloric acid to render the solution slightly acidic. The resulting solids are collected from the cooled mixture and recrystallized from isopropanol-cyclohexane to give 12 g. of 3-amino-5-ethylamino-6-chloropyrazinoic acid, M.P. 150–155° C.

Step B: Preparation of 2-nitro-3-amino-5-ethylamino-6-chloropyrazine.—3-amino-5-ethylamino-6-chloropyrazinoic acid (6.3 g.) from Step A is finely divided and added slowly to 25 ml. of concentrated sulfuric acid while maintaining the temperature below 10° C. To the resulting mixture a solution composed of 2 ml. of concentrated sulfuric acid and 2 ml. of concentrated nitric acid is added dropwise with stirring while maintaining the temperature below 10° C. The solution is stirred for an additional hour during which time the temperature rises spontaneously to 15° C. The solution is poured onto crushed ice with stirring. The resulting precipitate is collected (3.0 g.) and recrystallized from ethyl acetate to give 1.5 g. of 2-nitro-3-amino-5-ethylamino-6-chloropyrazine, M.P. 138–140° C.

A similar experiment conducted below 0°C . yields 3.9 g. of crude product and recrystallization from benzene results in 3.5 g. of product with M.P. 138–140° C.

Step C: Preparation of 2-nitro-3-phenacetylamino-5-ethylamino-6-chloropyrazine.—A solution of 2.0 g. of 2-nitro - 3 - amino - 5 - ethylamino - 6 - chloropyrazine in 40 ml. of phenacetyl chloride is heated on a steam bath for 2 hours. After cooling, the precipitate is collected and recrystallized from benzene to give 1.5 g. of 2-nitro-3-phenacetylamino - 5 - ethylamino-6-chloropyrazine, M.P. 218–219° C.

Employing the procedure exactly as described above, except that phenylacetic anhydride is substituted for the phenacetyl chloride, and that the product is isolated by evaporaiton of the solvent, the same product is obtained.

Step D: Preparation of 2-amino-3-phenacetylamino-5-ethyl-amino-6-chloropyrazine.—A solution of 1.4 g. of 2-nitro - 3 - phenacetylamino - 5 - ethylamino - 6 - chloropyrazine in 200 ml. of ethylacetate is hydrogenated over 200 mg. of 5% platinum on carbon until the theoretical amount of hydrogen is absorbed. The catalyst is removed by filtration and the filtrate is concentrated to 100 ml. The product is obtained by heating the concentrated filtrate and adding hexane to incipient cloudiness, and cooling. There is obtained 1 gm. of 2-amino-3-phenacetylamino - 5 - ethylamino - 6 - chloropyrazine, M.P. 168–169° C.

Step E: Preparation of 2-benzyl-5-ethylamino-6-chloroimidazo[4,5-b]pyrazine.—A mixture of 2 - amino - 3-phenacetylamino - 5 - ethylamino - 6 - chloropyrazine (1.0 g.) and acetic acid (15 ml.) is heated on a steam bath for 0.5 hour. The solution is concentrated to dryness and the residue is recrystallized from ethyl acetate-hexane to give 400 mg. of 2 - benzyl - 5 - ethylamino - 6 - chloroimidazo[4,5-b]pyrazine, M.P. 225–226° C.

EXAMPLE 2

2-phenyl-5-ethylamino-6-chloroimidazo[4,5-b]pyrazine

Employing the procedure essentially as described in Example 1, Steps A to E but substituting for the phenacetyl chloride used in Step C, an equivalent amount of benzyl chloride, there are produced in sequence:

Step C: 2 - nitro - 3 - benzoylamino - 5 - ethylamino-6-chloropyrazine; M.P. 174–175° C.
Step D: 2 - amino - 3 - benzoylamino - 5 - ethylamino-6-chloropyrazine; M.P. 197–198° C.
Step E: 2 - phenyl - 5 - ethylamino - 6 - chloroimidazo [4,5-b]pyrazine; M.P. 210–212° C.

EXAMPLE 3

2-methyl-5-ethylamino-6-chloroimidazo[4,5-b]pyrazine

Employing the procedure essentially as described in Example 1, Steps A to E, but substituting for the phenacetyl chloride used in Step C, an equivalent amount of acetyl chloride or acetic anhydride, there are produced in sequence:

Step C: 2 - nitro - 3 - acetylamino - 5 - ethylamino - 6 - chloropyrazine; M.P. 227–230° C.
Step D: 2 - amino - 3 - acetylamino - 5 - ethylamino - 6 - chloropyrazine; M.P. 193–194° C.
Step E: 2 - methyl - 5 - ethylamino - 6 - chloroimidazo [4,5-b]pyrazine; M.P. 300–302° C.

Employing the procedure substantially as described in Example 1, steps A to E but substituting for the methyl 3 - amino - 5 - ethylamino - 6 - chloropyrazinoate used in Step A and the phenacetyl chloride used in Step C, the methyl 3 - $R^1NH$ - 5 - $R^3R^4N$ - 6 - X - pyrazinoates and the acid chlorides or anhydrides of formula $R^2COCl$ or $(R^2CO)_2O$ respectively described in Table I, there are produced in sequence:

Step A: 3-$R^1$NH-5-$R^3R^4$N-6X-pyrazinoic acids.
Step B: 2-nitro-3-$R^1$NH-5-$R^3R^4$N-6X-pyrazines.
Step C: 2-nitro-3-($R^1$)($R^2$CO)N-5-$R^3R^4$N-6-X-pyrazines.
Step D: 2-amino-3-($R^1$)($R^2$CO)N-5-$R^3R^4$N-6-X-pyrazines.
Step E: 2 - $R^2$ - 3 - $R^1$ - 5 - $R^3R^4$N - 6 - X - imidazo [4,5-b]pyrazines also describe in Table I, in accordance with the following reaction sequence:

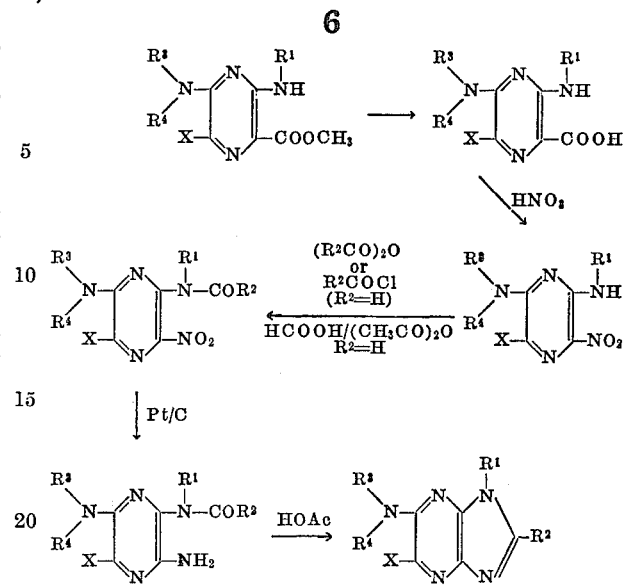

TABLE I

| Example | $R^1$ | $R^2$ | $R^3$ | $R^4$ | X |
|---|---|---|---|---|---|
| 4 | $CH_3$— | $C_2H_5$— | $C_2H_5$— | H | Cl |
| 5 | $CH_3O(CH_2)_2$— | i-$C_3H_7$— | $C_2H_5$— | H | Cl |
| 6 | $(CH_3)_2N(CH_2)_2$— | n-$C_4H_9$— | $C_2H_5$— | H | Cl |
| 7 | $CH_2$=CH—$CH_2$— | n-$C_6H_{13}$— | $C_2H_5$— | H | Cl |
| 8 | $C_2H_5$— | $CH_3$— | $CH_3$— | $CH_3$— | Cl |
| 9 | H | —$(CH_2)_2$—C6H5 | H | H | Cl |
| 10 | H | —$(CH_2)_3$—C6H5 | $CH_3$— | $CH_3$— | Cl |
| 11 | H | —$CH_2$—C6H4—$CH_3$ | $CH_3O(CH_2)_2$— | H | Cl |
| 12 | H | —$CH_2$—C6H4—Cl | pyridyl-$CH_2$— | | Cl |
| 13 | H | —$(CH_2)_2$—C6H4—$OCH_3$ | pyridyl-$CH_2$— | H | Cl |
| 14 | H | —$(CH_2)_2$—C6H4F | i-$C_3H_7$NH$(CH_2)_3$— | H | Cl |
| 15 | H | —$CH_2OCH_3$ | $(C_2H_5)_2N(CH_2)_2$— | H | Cl |
| 16 | H | —$CH_2CH_2$—O—C6H5 with $CH_3$ | $(CH_3)_2N(CH_2)_2$— | H | Cl |
| 17 | H | —$CH_2OCH_3$ | $(CH_3)_2N(CH_2)_4$— | H | Cl |
| 18 | H | —$CH_2CH_2$—O—C6H5 with $CH_2$—$CH_3$ | piperidinyl-$(CH_2)_2$— | H | Cl |
| 19 | | —$CH_2$—O—C6H5 | $CH_3N$-piperazinyl-$N(CH_2)_3$— | H | Cl |
| 20 | H | —C6H5 | morpholinyl-$N(CH_2)_3$— | H | Cl |
| 21 | H | —C6H4—$CH_3$ | n-$C_3H_7$— | $CH_3$— | Cl |
| 22 | H | 3,4-di$CH_3$-C6H3— | —$(CH_2)_2$—N($C_2H_5$)—$(CH_2)_2$— | | Cl |

TABLE I—Continued

| Example | R¹ | R² | R³ | R⁴ | X |
|---|---|---|---|---|---|
| 23 | H | —C₆H₄—Cl | —(CH₂)₂—O—(CH₂)₂— | | Cl |
| 24 | H | —C₆H₄—F | CH₃(n-C₄H₉)N(CH₃)₂— | H | Cl |
| 25 | H | —C₆H₄—OCH₃ | (CH₃)₂N(CH₂)₃— | CH₃— | Cl |
| 26 | H | —C₆H₃(OCH₃)₂ | (C₂H₅)₂N(CH₂)₂— | CH₃— | Cl |
| 27 | H | CH₃— | (CH₃)₂N—C=N(CH₃)₂ | | Cl |
| 28 | H | CH₃— | n-C₃H₇— | H | Cl |
| 29 | H | —CH₂—C₆H₅ | CH₂=CH—CH₂— | H | Cl |
| 30 | H | —C₆H₅ | n-C₄H₉— | H | Cl |
| 31 | H | —CH₃ | i-C₃H₇— | H | Cl |
| 32 | H | —CH₃ | t-C₄H₉— | H | Cl |
| 33 | H | —CH₂OCH₃ | cyclopentyl— | H | Cl |
| 34 | H | —CH₃ | pyridyl-CH₂— | H | Cl |
| 35 | H | —C₂H₅ | CH₃— | C₂H₅— | Cl |
| 36 | H | —C₂H₅ | —(CH₂)₅— | | Cl |
| 37 | H | —CH₂—C₆H₅ | —(CH₂)₂—N(CH₃)—(CH₂)₂— | | Cl |
| 38 | H | —CH₃ | H | H | Br |
| 39 | H | —CH₂OCH₃ | CF₃CH₂— | H | Cl |
| 40 | H | —CH₃ | CF₃(CH₂)₂— | H | Cl |
| 41 | H | —CH₃ | CH₃— | CH₃— | CH₃— |
| 42 | H | —n-C₆H₁₃ | CH₂=CH—CH₂— | CH₃— | Cl |
| 43 | H | —CH₃ | CH₃— | Cl | Cl |
| 44 | H | —CH₃ | piperidinyl—(CH₂)₂— | H | Cl |
| 45 | H | —CH₃ | piperidinyl—(CH₂)₃— | H | Cl |

EXAMPLE 46

5-ethylamino-6-chloroimidazo[4,5-b]pyrazine

Step A: Preparation of 2-nitro-3-formylamino-5-ethylamino-6-chloropyrazine.—A solution of 5.3 ml. of acetic anhydride and 2.2 ml. of formic acid is heated at 50–60° C. for 1.5 hours and then added to 4.0 g. of 2-nitro-3-amino-5-ethylamino-6-chloropyrazine. This mixture is heated on a steam bath for 2 hours and then cooled. The precipitated solid is collected and recrystallized from benzene to give 3.5 g. of 2-nitro-3-formylamino-5-ethylamino-6-chloropyrazine, M.P. 172–173° C.

Step B: Preparation of 2 - amino - 3 - formylamino-5 - ethylamino - 6 - chloropyrazine.—Following the procedure of Example 1, Step D but substituting for the 2 - nitro - 3 - phenacetylamino - 5 - ethylamino - 6-chloropyrazine used in Step D an equivalent amount of the 2 - nitro - 3 - formylamino - 5 - ethylamino - 6-chloropyrazine from Step A of this example, there is produced 2 - amino - 3 - formylamino - 5 - ethylamino-6-chloropyrazine, M.P. 173–175° C.

Step C: Preparation of 5-ethylamino-6-chloroimidazo[4,5-b]pyrazine.—Following the procedure of Example 1, Step E, but substituting for the 2-amino-3-phenacetylamino-5-ethylamino - 6 - chloropyrazine used therein, an equivalent amount of 2 - amino-3-formylamino-5-ethylamino-6-chloropyrazine, there is produced 5-ethylamino-6-chloroimidazo[4,5-b]pyrazine, M.P. 252–254° C.

Following the procedure substantially as described in Example 46, Steps A to C, but substituting for the 2-nitro-3-amino-5-ethylamino-6-chloropyrazine utilized in Step A, an equivalent amount of the 2-nitro-3-R¹NH-5-R³R⁴N-6-X-pyrazines described in Table II, there are produced the 1-R¹-5-R³R⁴N-6-X-imidazo[4,5-b]pyrazines also described in Table II, in accordance with the following equation:

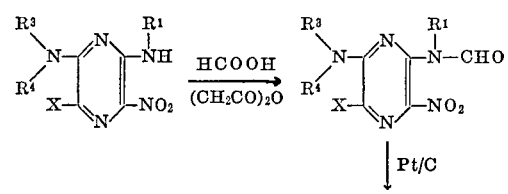

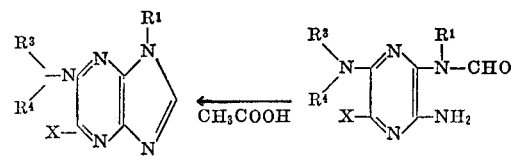

TABLE II

| Ex. | R¹ | R³ | R⁴ | X |
|---|---|---|---|---|
| 47 | H | t-C₄H₉— | H | Cl |
| 48 | H | H | H | Br |
| 49 | H | —CH₃ | CH₃— | CH₃— |
| 50 | H | —CH₃ | n-C₄H₉— | Cl |
| 51 | H | 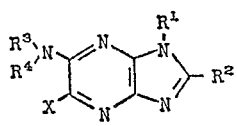 | H | Cl |
| 52 | CH₃O(CH₂)₂— | C₂H₅— | H | Cl |

EXAMPLE 53

Dry filled capsule containing 50 mg. of active ingredient

| | Per capsule, mg. |
|---|---|
| 2 - methyl - 5 - ethylamino-6-chloroimidazo[4,5-b] pyrazine | 50 |
| Lactose | 275 |
| Mixed powders | 325 |

Mix the 2-methyl-5-ethylamino-6-chloroimidazo[4,5-b] pyrazine from Example 3, and lactose and reduce to a No. 60 mesh powder. Encapsulate, filling 325 mg. into each No. 2 capsule.

What is claimed is:

1. A process for the preparation of a compound of structural formula

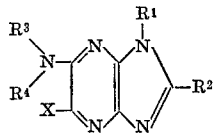

wherein $R^1$ is a member selected from the group consisting of
   (a) hydrogen,
   (b) lower alkenyl,
   (c) lower alkyl,
   (d) lower(alkoxy-alkyl), and
   (e) di(lower alkyl)amino-lower alkyl;
$R^2$ is a member selected from the group consisting of
   (a) hydrogen,
   (b) phenyl,
   (c) lower alkyl-phenyl,
   (d) halo-phenyl,
   (e) lower alkoxy-phenyl,
   (f) lower alkyl,
   (g) trifluoromethyl-lower alkyl,
   (h) lower(alkoxy-alkyl),
   (i) phenoxy-lower alkyl,
   (j) phenyl-lower alkyl,
   (k) lower alkyl-phenyl-lower alkyl,
   (l) lower alkoxy-phenyl-lower alkyl, and
   (m) halophenyl-lower alkyl;
$R^3$ is a member selected from the group consisting of
   (a) hydrogen,
   (b) lower alkenyl,
   (c) lower cycloalkyl,
   (d) lower alkyl,
   (e) trifluoromethyl-lower alkyl,
   (f) pyridyl-lower alkyl,
   (g) $R^5R^6$N-lower alkyl, wherein each of $R^5$ and $R^6$ is lower alkyl,
   (h) $R^5R^6$N-lower alkyl, wherein $R^5$ and $R^6$ are linked together directly to form a 5-7 membered saturated heterocycle with the nitrogen atom to which they are attached,
   (i) $R^5R^6$N-lower alkyl, wherein $R^5$ and $R^6$ are linked through a hetero atom to form a morpholino or N-lower alkyl-piperazino group;
$R^4$ is a member selected from the group consisting of
   (a) hydrogen, and
   (b) lower alkyl;

$R^3$ and $R^4$ when lower alkyl can be linked together directly to form a 5-7 membered saturated heterocycle with the nitrogen atom to which they are attached;
$R^3$ and $R^4$ when lower alkyl can be linked together through a hetero atom to form a morpholino, or N-lower alkyl-piperazino group; and
X is a member selected from the group consisting of
   (a) lower alkyl, and
   (b) halo;
which comprises heating in an anhydrous solvent a compound of structural formula

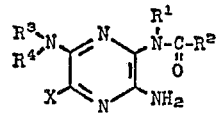

2. The process of claim 1, wherein X is chloro.
3. The process of claim 1, wherein X is chloro and $R^1$ is hydrogen.
4. The process of claim 1, wherein X is chloro, $R^1$ is hydrogen and $R^3$ and $R^4$ are lower alkyl.
5. The process of claim 1, wherein X is chloro, $R^1$ and $R^4$ are hydrogen and $R^3$ is lower alkyl.
6. The process of claim 1, wherein X is chloro, $R^1$ and $R^4$ are hydrogen, and $R^3$ is ethyl.
7. The process of claim 1, wherein X is chloro, $R^1$ and $R^4$ are hydrogen, $R^3$ is ethyl, and $R^2$ is hydrogen.
8. The process of claim 1, wherein X is chloro, $R^1$ and $R^4$ are hydrogen, $R^3$ is ethyl and $R^2$ is methyl.
9. The process of claim 1, wherein X is chloro, $R^1$ and $R^4$ are hydrogen, $R^3$ is ethyl and $R^2$ is phenyl.
10. The process of claim 1, wherein X is chloro, $R^1$ and $R^4$ are hydrogen, $R^3$ is ethyl and $R^2$ is benzyl.
11. A compound of structural formula wherein $R^1$ is a member selected from the group consisting of
   (a) hydrogen,
   (b) lower alkenyl,
   (c) lower alkyl,
   (d) lower(alkoxy-alkyl), and
   (e) di(lower alkyl)amino-lower alkyl;
$R^2$ is a member selected from the group consisting of
   (a) hydrogen,
   (b) phenyl,
   (c) lower alkyl-phenyl,
   (d) halo phenyl,
   (e) lower alkoxy-phenyl,
   (f) lower alkyl,
   (g) trifluoromethyl-lower alkyl,
   (h) lower(alkoxy-alkyl),
   (i) phenoxy-lower alkyl,
   (j) phenyl-lower alkyl,
   (k) lower alkyl-phenyl-lower alkyl,
   (l) lower alkoxy-phenyl-lower alkyl, and
   (m) halophenyl-lower alkyl;
$R^3$ is a member selected from the group consisting of
   (a) hydrogen,
   (b) lower alkenyl,
   (c) lower cycloalkyl,
   (d) lower alkyl,
   (e) trifluoromethyl-lower alkyl,
   (f) pyridyl-lower alkyl,
   (g) $R^5R^6$N-lower alkyl, wherein each of $R^5$ and $R^6$ is lower alkyl,
   (h) $R^5R^6$N-lower alkyl, wherein $R^5$ and $R^6$ are linked together directly to form a 5-7 membered saturated heterocycle with the nitrogen atom to which they are attached, (i) $R^5R^6N$-lower alkyl, wherein $R^5$ and $R^6$ are linked through a hetero atom to form a morpholino or N-lower alkyl-piperazino group;

$R^4$ is a member selected from the group consisting of
(a) hydrogen, and
(b) lower alkyl;

$R^3$ and $R^4$ when lower alkyl can be linked together directly to form a 5–7 membered saturated heterocycle with the nitrogen atom to which they are attached;

$R^3$ and $R^4$ when lower alkyl can be linked together through a hetero atom to form a morphilino, or N-lower alkyl-piperazino group; and X is a member selected from the group consisting of
(a) lower alkyl, and
(b) halo.

12. The compound of claim 11, wherein X is chloro.

13. The compound of claim 11, wherein X is chloro and $R^1$ is hydrogen.

14. The compound of claim 11, wherein X is chloro, $R^1$ is hydrogen and $R^3$ and $R^4$ are lower alkyl.

15. The compound of claim 11, wherein X is chloro, $R^1$ and $R^4$ are hydrogen and $R^3$ is lower alkyl.

16. The compound of claim 11, wherein X is chloro, $R^1$ and $R^4$ are hydrogen, and $R^3$ is ethyl.

17. The compound of claim 11, wherein X is chloro, $R^1$ and $R^4$ are hydrogen, $R^3$ is ethyl, and $R^2$ is hydrogen.

18. The compound of claim 11, wherein X is chloro, $R^1$ and $R^4$ are hydrogen, $R^3$ is ethyl and $R^2$ is methyl.

19. The compound of claim 11, wherein X is chloro, $R^1$ and $R^4$ are hydrogen, $R^3$ is ethyl and $R^2$ is phenyl.

20. The compound of claim 11, wherein X is chloro, $R^1$ and $R^4$ are hydrogen, $R^3$ is ethyl and $R^2$ is benzyl.

References Cited
UNITED STATES PATENTS 3,549,633  12/1970  Grabowski et al. ____ 260—250

NICHOLAS S. RIZZO, Primary Examiner

U.S. Cl. X.R.

424—250; 260—247.2 A, 247.5 R, 268 R